May 9, 1967  C. G. MATSON  3,318,163
VIBRATION MECHANISM
Filed Feb. 17, 1964  2 Sheets-Sheet 1

INVENTOR.
CARL G. MATSON
BY Fidler, Bradley, Patnaude &
Petherbridge
ATTYS.

May 9, 1967 C. G. MATSON 3,318,163
VIBRATION MECHANISM
Filed Feb. 17, 1964 2 Sheets-Sheet 2

INVENTOR.
CARL G. MATSON
BY Fidler, Bradley, Putnam &
Petherbridge
ATTYS.

United States Patent Office 3,318,163
Patented May 9, 1967

3,318,163
VIBRATION MECHANISM
Carl G. Matson, Kewanee, Ill., assignor to Vibrator Manufacturing Company, Neponset, Ill., a corporation of Illinois
Filed Feb. 17, 1964, Ser. No. 345,431
24 Claims. (Cl. 74—87)

The present invention relates broadly to fluid actuated mechanical vibration mechanism and method; more particularly to a gas-driven rotary device for imparting substantially sinusoidal vibrations to a part to which it may be attached; and still more particularly to an air-driven rotary device including a new method and apparatus for establishing vibration characteristics and imparting orbital vibrations in a substantially harmonic manner to structural elements.

Machines of this general type have been in use for several years and are employed for facilitating and/or aiding manual transfer of materials in chutes, and the like; are used for vibrating storage bins to settle materials contained therein and/or control the movement of materials to and from bins; for enabling convenient unloading of dump-type equipment; in foundry work, and the like, for aiding compacting of flasks; and for numerous and varied other purposes.

This particular improved mechanism, to be described in detail below, is characterized by being compact while delivering very high frequency vibrations to articles or things to which it is attached. While the device is not to be limited in its broadest concepts, it is preferred that the single movable element, substantially in the form of a disk, ring, or the like, is operable in a range to create harmonic vibrations by orbiting in a path of travel predetermined by retaining means for the device. The vibrations are preferably in a range exceeding a few orbital vibrations for each revolution of a rotor but can effect a large number of vibrations during one complete revolution of the rotor.

The device is further characterized in that the rotor diameter is so selected with relationship to a bore forming a race within which it revolves to render several orbital vibrations per rotor revolution. The device is further characterized by a transient gas exhaust which orbits with the rotor to create a new spatial orientation of the rotor in the race with respect to an outlet ecliptic. The ecliptic provides a relatively lower pressure air spaced substantially diametrically across diametral segments of the periphery of the disk with relationship to a relatively high presure area on the opposite side thereof.

In carrying out refinements of this invention, the variably positioned ecliptic exhaust, or other conventional exhaust, is sized to cause a pressure drop of driving fluid, such as air for example, to expend substantially 95% of its energy in the form of pressure in performing the work creating the orbital vibrations.

Prior vibrators, substantially of the genus of the present invention, have differed in several respects from the present invention in operating in such manner as to attain by rotors thereof of several sorts; for example, the ball type rotors set forth in several patents issued to Edwin F. Peterson, wherein a hard steel ball is restrained by a pair of hardened and ground raceways to control and direct the orbiting of the ball. The construction and arrangement of such vibrators includes precise raceways and have attained wide acceptance and have long life.

The present invention, while hard elements are desirable, is conducive to manufacture by standard machining procedures (not requiring grinding or hardening of parts) while still providing a long life for the device. Of course, when extra long life is essential in the device, hardened parts can readily be assembled with certain standard parts of the assembly while providing such features of hardening of the long-lived operating parts.

Another significant attribute of this invention resides in the characteristic of the fluid pressure differential of providing a new and effective air lubrication of the parts, at least in certain ranges of operations in which the device is adapted for use.

Accordingly, it is a broad object of this invention to provide improved fluid-driven vibrating devices.

Another object in keeping with the preceding object is to provide an air-lubricated vibrating device.

A further object in keeping with either of the preceding objects is to provide an improved vibrator adapted to operate at numerous selected frequencies of vibrations.

Another object in connection with the preceding object is to provide a fluid driven vibrator operable in high frequency ranges.

An object in keeping with each of the preceding objects is to provide a vibrating device producing high frequencies of orbital vibrations during each revolution of a rotor inducing the vibrations.

A further object in keeping with any of the preceding objects is to provide a rotor in the form of a circular member.

Another object in connection with the preceding object is to provide a rotor in the form of a disk or ring, or the like.

Another object of this invention is to provide an improved method for design characteristics and/or parameters for vibration apparatus of the character to be described below, as well as other related articles of manufacture.

Other objects, features and advantages of this invention reside in inherent attributes of the device and will be either obvious or pointed out in the following specification and claims read in view of the accompanying drawings in which:

Figure 1:
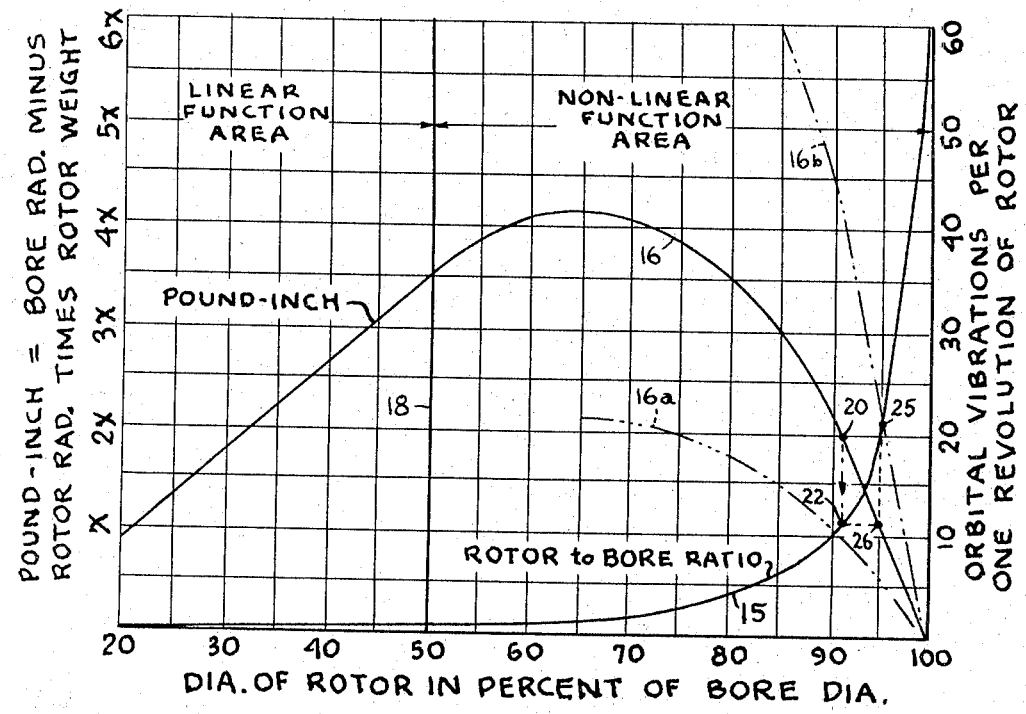
FIG. 1 is a combination of at least two super-imposed charts illustrating plural functions of the invention.

Referring now in more detail to the drawings, FIG. 1 is a chart showing certain of several possible charts that can be superimposed upon one another. Because "families" of curves may be desirable in different inertia ratios, for example, such families may be placed on transparent material, not shown, over a chart having an orbital characteristic curve. This latter orbital characteristic is fixed, and therefore as an alternative, can conveniently be on transparent material as an overlay for several family charts.

Orbital vibration plotted with respect to revolutions of a rotor is used to establish design parameters for uses to which a vibrator including a rotor is to be put. A ratio of rotor diameter with relationship to bore diameter minus rotor diameter appears on the chart as solid line 15. This line would attain zero at zero percent of diameter of rotor with respect to the diameter of a bore indicated at the base of the chart. This line 15 will asymptotically approach the right-hand line representing 100% of rotor diameter in which no rotation would be possible. The right-hand numbers 0 to 60 are representative of orbital vibrations of a rotor per one revolution thereof with reference to line 15. With a rotor diameter approximately 90% of bore diameter some 10 orbital vibrations will occur per rotor revolution.

Superposed with respect to line 15 is a line 16 which is in pound-inches that is an unbalanced force that varies as a rotor varies away from and back to zero as the rotor diameter varies from zero diameter to 100% diameter of the bore of the vibrating device. It is to be noted when the diameter of the rotor is less than 50% diameter of the bore, represented by the vertical line 18 (at 50%) that this curve is linear. The curve 16 is selected for a ¼ inch thick carbon steel solid disc rotor. In this area of the curve to the left of the line 18 as the size or diameter of the rotor has increased, its center of gravity with relationship to the center of orbit will decrease. Accordingly, the left-hand ordinate of the chart is set forth with an $x$ factor which may vary according to the algebraic characteristic of curve 16 as indicated by lines 16a and 16b. Such variance can be effected by having rotors of one-half the thickness and double the thickness, respectively, of the ¼ inch thick rotor, and accordingly a family of curves could be arrived at for use in connection with the curve 15 for many thicknesses.

In the example herein used, it may be assumed that the bore diameter is a known whole factor, for example 10 inches in diameter in a larger sized vibrator. With such vibrator, it may be desirable to attain a certain predetermined centrifugal force in order to facilitate and/or effect movement of a predetermined weight of material. Accordingly, a point such as point 20 (lower right side of the chart) may be selected on the curve 16 representing the one-fourth inch thick rotor. It is noted that this thickness of rotor has a $2x$ factor which, in this example using a one-fourth inch rotor, would represent two pound-inches of unbalanced weight, with $x$ equaling 1. By projecting vertically downward from the point 20 on curve 16 to a point 22 on the curve 15, it is to be noted that there are approximately 11 orbital revolutions per one revolution of the rotor.

In cases where a lower number of revolutions are desired, the point 20 could be moved to the left to bring the number of orbital vibrations below 10, for example, or could be moved to the right from the position shown across the point of intersection 25 of lines 15 and 16 where a greater number of orbits per revolution are desired. However, at such higher frequency orbiting the unbalanced weight in pound-inches is reduced substantially and could become about one and one-tenth pound-inch at point 26, for example; but the vibrations per rotor revolution, point 25 curve 15, will be twenty-one.

In whatever way the selection may be based it is desirable to keep the revolutions of the rotor within an area in that part of the right-side of the chart permitting a wide selection of characteristics best suited for different applications of the vibrating apparatus to be described in detail hereinafter. In each selection, however, the user of the method and device will be able facilely to calculate the vibration attributes and effectiveness of the device in the selected range.

Method

For example only, the points 20 and 22 may be selected, then, with it being within the mechanical capabilities of the rotor to make about 900 revolutions per minute, there will be about 10,000 orbit vibrations in each minute. At an unbalanced weight of two pounds operating at 10,000 revolutions per minute, a centrifugal force of about 5,800 pounds will be achieved. With a rotor capable of turning at only half such speed, for instance, about 500 r.p.m. to again attain 10,000 revolutions per minute, a point 25 may be selected on a rotor diameter along the line 15. Such position indicates 21 orbital vibrations for one rotation of the rotor which projects downward on the 95% line to point 26 with a pound-inches unbalance of about one and one-tenth pounds.

At this position, 10,000 orbital vibrations per minute the centrifugal force obtained will be approximately one-half that obtained in the example immediately above, or 3,000 pounds. However, as represented by the line 16b by doubling the rotor thickness to ½ inch, this force could be increased to about 6,000 pounds. Centrifugal forces can be readily ascertained in using this method by a formula C.F.$=.0000284 \times$pound-inch$\times$orbital vibrations squared. The value of C.F. thus calculated is a minute percentage higher than actual centrifugal force. The pound-inch factor is ascertained by bore radius minus rotor radius times rotor weight in pounds.

The above specific example is not to be construed in a limiting sense inasmuch as this method of selection within parameters and/or characteristics adapted for the chart or charts used in both linear and non-linear ranges. It is preferred that in the linear range the parameter be in different scales because the values, particularly at the lower range of orbital vibrations per rotor revolution, is not varied in such marked manner as in the non-linear area of the charts described immediately above.

To accomplish the attribute of the invention and facilitate design of vibrating equipment in accordance therewith, the following Chart A, shown partially only, can be used.

CHART A

[Based on 10" diameter bore]

1" dia. rotor–9" of difference creates ⅑ vib./rev.
2" dia. rotor–8" of difference creates ¼ vib./rev.
3" dia. rotor–7" of difference creates 3/7 vib./rev.
4" dia. rotor–6" of difference creates ⅔ vib./rev.
5" dia. rotor–5" of difference creates 1 vib./rev.
6" dia. rotor–4" of difference creates 1½ vib./rev.
7" dia. rotor–3" of difference creates 2⅓ vib./rev.
8" dia. rotor–2" of difference creates 4 vib./rev.
9" dia. rotor–1" of difference creates 9 vib./rev.
9.5" dia. rotor–.5" of difference creates 19 vib./rev.
9.75" dia. rotor–.25" of difference creates 39 vib./rev.
9.875" dia. rotor–.125" of difference creates 79 vib./rev.

The above Chart A is based on the example of 10" diameter rotor ¼ inch long. This Chart A can be extended to severeal lines in known manner to include thicknesses from ⅛ inch (and thinner) to greater thicknesses than ¼ inch, and may vary greatly in extremely small sized to extremely large capacity vibrators. In each such chart, a correction factor can be applied to the factor $x$ above. For example, a 5 inch bore represents 50% of the above; and hence the two left-hand columns would read one-half the value of the numbers shown. The right-hand vibration/revolution column will then be identical as above.

The above Chart A, as well as the curve 15, FIG. 1, of orbital vibrations for one revolution of the rotor has been arrived at conveniently by development of the following formula: Ratio$=d/(D-d)$, where $D=$bore diameter and $d=$rotor diameter. The orbits create vibrations of predeterminable frequency for one revolution of the rotor and is equal substantially to the diameter differences of the rotor which traverses the bore in both an orbital and rotating manner. Because the rotor must essentially be smaller than the bore, the above formula has been ascertained, and has proven substantially accurate for use of this invention because the formula inherently includes subtraction of one orbit per 360 degrees rotation of the rotor. Since pi would appear both above and below the division line in the formula, it will divide out. This formula can also be expressed in bore and rotor diameters differently thus; $D/(D-d)-1$, for use when it is so preferred. In other words, one formula is equal to another; $(d/D-d)=D/(D-d)-1$.

To further facilitate employment of the method of this invention, a Chart B is based on a carbon steel disk rotor of 10" diameter maximum for fitting a 10" bore, in keeping with the above disclosure. It is to be understood that for larger or smaller diameter disks that correction factors for the pound-inch unbalance figures in the body of the chart can be modified, but that as the relative diameters for a given thickness varies the pound-inch unbalance will vary as a square function. For example, the 8" diameter rotor, ¼" thick, in a 10" bore has a three and one-half pound-inch force. However, a 4" diameter rotor in a 5" diameter bore will not read truly as indicated in Chart B at 2¾ pounds, but would read as a function of the 8" diameter rotor expressed as 3½ pound-inches in Chart B. Because the 4" diameter rotor will have approximately one-fourth the weight of an 8" diameter rotor, and will have an effective eccentric arm of one-half inch in a 5" diameter bore. A different Chart B would need be compiled to accommodate such differences.

CHART B
[Based on 10" diameter bore]

1" dia. rotor ¼" thick produces ¼ pound-inch.
2" dia. rotor ¼" thick produces 9/10 pound-inch.
3" dia. rotor ¼" thick produces 1¾ pound-inches.
4" dia. rotor ¼" thick produces 2¾ pound-inches.
5" dia. rotor ¼" thick produces 3½ pound-inches.
6" dia. rotor ¼" thick produces 4 pound-inches.
7" dia. rotor ¼" thick produces 4 pound-inches.
8" dia. rotor ¼" thick produces 3½ pound-inches.
9" dia. rotor ¼" thick produces 2¼ pound-inches.
9½" dia. rotor ¼" thick produces 1¼ pound-inches.

To further facilitate practice of this invention, the following Chart C is set out; which again is in terms of a 10" diameter carbon steel rotor but setting forth the pound-inch unbalance in percent of bore and percent of rotor diameters to bore diameters. In the Chart C, the columns are headed up along the ordinates in rotor thickness and set forth in percentage of rotor diameter to the abscissae. This chart can be used additionally for interpolation for different bore and rotor diameters, keeping in mind that as the diameters of these disks change, they vary as a square function of the diameter and accordingly would vary according to the basis of ten inches as used in this example.

CHART C.—CARBON STEEL
[Pound-inch unbalance in terms of rotor thickness based on a 10" diameter bore]

| Rotor Dia. in 0/0 Bore Dia. | Rotor Thickness | | | | | |
|---|---|---|---|---|---|---|
| | ⅛" | ¼" | ½" | 1" | 2" | 4" |
| 10 | ⅛ | ¼ | ½ | 1 | 2 | 4 |
| 20 | 9/20 | 9/10 | 1¾ | 3⅜ | 7⅛ | 14⅜ |
| 30 | ⅞ | 1¾ | 3½ | 7 | 14 | 28 |
| 40 | 1⅜ | 2¾ | 5½ | 11 | 22 | 44 |
| 50 | 1¾ | 3½ | 7 | 14 | 28 | 56 |
| 60 | 2 | 4 | 8 | 16 | 32 | 64 |
| 70 | 2 | 4 | 8 | 16 | 32 | 64 |
| 80 | 1¾ | 3½ | 7 | 14 | 28 | 56 |
| 90 | 1⅛ | 2¼ | 4½ | 9 | 18 | 36 |
| 95 | ⅝ | 1¼ | 2½ | 5 | 10 | 20 |
| 97 | 3/10 | ⅜ | 1⅛ | 2⅜ | 4⅜ | 9⅜ |

It is to be understood in connection with practicing the above method that such rotors, because of gyroscopic effects, have intermittent annular forces acting thereon because the vibrator device moves primarily in the sense tending to contain a plane of annular rotation traced by a point on the rotor. However, because the rotor oscillates in this path and is subjected to angular forces outside thereof due to vibrations induced thereby there are certain precessive forces of complex nature that tend to cause slippage due to side and edge friction in devices of this type. Such precessive forces are at an angle to the above point-traced-plane, and can attain high values. The method calculating suitable forces and stresses for application of vibrating apparatus and devices in keeping with this formula are enhanced by these secondary forces, and it is desired these be covered by the claims of this invention.

*Mechanism*

Figures 2, 3:
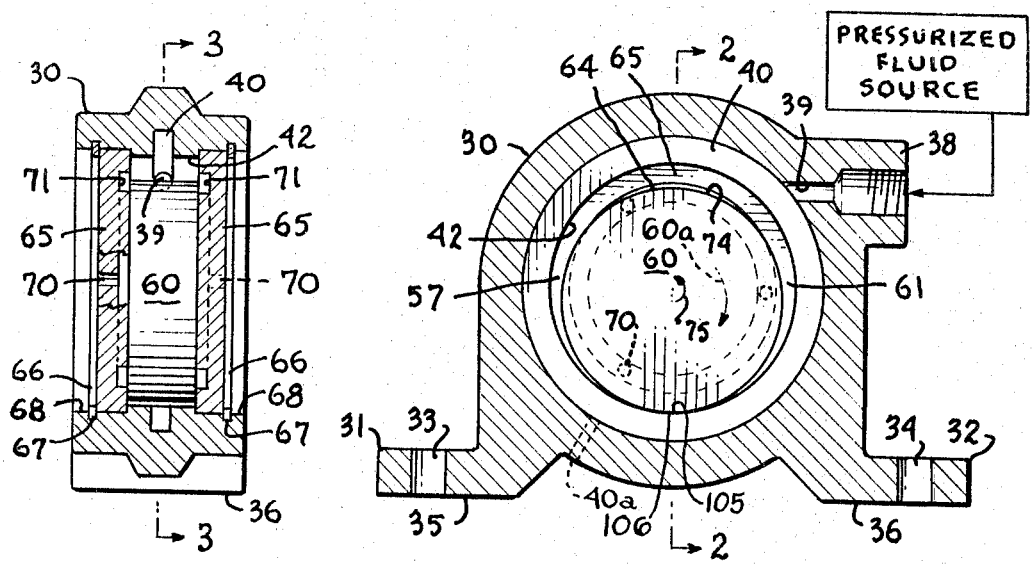
FIG. 2 is a vertical sectional view of one preferred form of vibrator taken substantially on lines 2—2 of FIG. 3.
FIG. 3 is a vertical sectional view taken substantially on lines 3—3 of FIG. 2.

Consider now the details of construction of a presently preferred embodiment of the invention with reference first to FIGS. 2, 3, 4 and 5. A housing generally indicated at 30 may be of cast iron, or other suitable material having favorable strength to weight to cost attributes, of generally circular cross section as shown in FIG. 2. The housing 30 has pedestal legs 31 and 32 or the like, provided with holes 33 and 34, respectively, for receiving through bolts, for example, for securing bottom surfaces 35 and 36 of the housing 30 to a suitable surface for imparting vibration thereto upon operation of the vibrator 30. A suitable fluid is supplied to a tapped boss 38 into an inlet port 39, which fluid can be any of several, such as air, steam, exhaust gasses, etc., to name a few. The device can also be run by liquid such as oil, water, etc., well known in connection with this art. The transverse center, FIG. 2, of the casting 30 is provided with an annular internal groove 40 providing a torus path for air; and which also extends completely around a ring 41, FIGS. 4 and 5, which may be press fitted in a transverse bore 42 in the casing 30.

The combination of the inlet port 39 and the groove 40 (with or without the ring 41) establishes the useful attribute of this invention of separating fluid entrained foreign materials from the driving fluid, which, for brevity, will be referred to as air hereinafter. Several arrangements for the vibrators include quick coupled hoses, or the like. These can be contaminated in several ways as by being dropped in abrasives, sand, etc., when uncoupled. On recoupling, the foreign material can become entrained and blown into the housing 30. The ring 41 can be positioned to act as a baffle for foreign material; and the air entering port 39 will centrifuge the material. A suitable small outlet port 40a (which may be tapped and screw plugged in large and/or for high contaminated service) can expel the foreign material. The centrifuge driving action of the torus of air in the groove 40 can likewise cause soft particles to be milled to powder upon the cast metal; in which use the outlet port may not be required. It is to be noted that uses requiring such structure presently comprises only a small percentage of the total usage.

The ring 41 at its internal face 44 comprises the bore of the formula set forth above and graphically illustrated in FIG. 1 and may be suitably machined by known screw machine and/or automatic machine and/or jig and fixture processes, to name a few. It is significant that hardening and grinding steps, and the like, are not required in this invention to provide a long-lived vibrator. For certain heavy duty service applications of this invention, the internal surface 44 of the ring 41 can be hardened and ground to provide an extremely long life and high force output in devices of this kind.

The ring 41 is provided with one or more holes 45 which are at their inner edges preferably substantially tangential with the internal surface 44 of the ring 41. Accordingly, the fluid entering through the boss 83 will pass from the annular recess 40 through the holes 45 and be ejected tangentially of the inner wall 44 of the ring 41 wherein they tend to cling and follow the inner wall 44 due to a Coanda-effect, which is well known phenomenon particularly of air and other gasses which tend to follow surfaces. Thus the air, with the parts in the position shown in FIG. 5, will tend to rotate at high velocity counterclockwise from the upper port 45 into an area 47 on the left-hand side of the rotor 92. Air also will pass into the lower port 45 adjacent a lower-most position of travel of the rotor 60. The air will be decelerated and, in the instantaneous position shown, thus tend to gain in pressure in the area 57. Because of aspiration phenomenon, fluid in an area 61 will tend to be aspirated to a certain degree as it passes toward an ecliptic opening 64, preferably opening to each side of the rotors 60 and 92, FIGS. 3 and 5.

Because of pressure differential across the rotor 60 between areas 57 and 61, which orbits to orbitationally cycle the ecliptic opening 64, there is an air lubrication characteristic apparently across the disk 60 and around the sides thereof to be mentioned herein more fully below.

Referring to FIGS. 2 and 3, the rotor 60 is retained by a pair of closure plates 65, which may be identical for most purposes, in substantially a central position in the housing 30 upon the inner surface of the bore 42 which forms a raceway for the rotor 60. The plates 65 are retained in place around the peripheral edges thereof by a pair of snap rings 66 fitting grooves 67 in counterbores in the casting 30. Each of the closure plates 65 may have one or more exhaust ports 70 communicating with annular grooves 71 on the inner faces of the closure member 65. The grooves 71 have their outermost edges arranged and positioned with the peripheral edge 74 of the disk 60 so as to provide a length of ecliptic opening 64 extending between substantially 90 and 120 degrees on the periphery 74 of the rotor 60.

It is conventional in this art to supply the vibrator devices with air at substantially 80 p.s.i. pressure. It has been found that, with a rotor 60 of ¼" thickness and approximately 9" in diameter, a clearance of two-thousandths of an inch on each side thereof with respect to the internal surfaces of the closure plates 65 apparently causes a film of air to be retained by molecular wetting of dry material (in the form of ordinary low carbon steel or cast iron or nickel bearing cast iron) and that air lubrication alone is serviceable and suitable for many adaptations of the present invention. It is thought, although not readily ascertainable, that the pressure difference existing across the rotor 60 between the area 57 and the area 61, mentioned above, contributes substantially to this attribute because these areas are also caused to orbit rapidly at the rate of orbiting of the rotor 60, at least in rotors having approximately 90% of the diameter of the bore in which they rotate, and the attribute and phenomenon probably prevail substantially above and below such 90% value.

In operation of the modification shown in FIGS. 2 and 3, air is introduced under pressure which, in starting the rotor 60 from "rest," causes a pressure build-up in the area 57 in excess of the pressure build-up in the area 61 which is shown communicating with the opening 64. The device will start up so long as there is enough air supply in excess of escape thereof through the exhaust port 64 to cause the rotor 60 to be urged toward the right and upwardly in a path of orbit 75 around the center point of the rotor 60.

When orbiting, a rotor 60 will roll along a dotted line 60a as the edge 74 thereof frictionally contacts the internal surface of the bore 42. As pointed out in connection with FIG. 1, the number of orbits per revolution in the different modifications are determined by the diameter differences of the bore FIG. 5 and the surface 74 FIG. 3. It has been found that an exhaust pressure out of the orbiting ecliptic opening 64 can be approximately 5% of that of the input pressure (in this case about four pounds per square inch) and the air will pass through channel 71 and out of exhaust ports 70 to atmosphere after having expended about 95% of its energy due to pressure.

As mentioned above briefly, this invention can utilize certain metals for parts as machined for many adaptations thereof. When an intermediate degree of hardness of relatively movable surfaces is desired, such parts can conveniently be fabricated from nickel-iron alloy irons or steels, or other known alloys having work hardening characteristics. Many nickel-iron alloys having such desirable characteristics for this invention work harden during use of a vibrator. Relatively movable, force effected, parts such as the bore 42 and rotor 60, at least, and retainer plates 65 when gyroscopic conditions prevail, can be made of these alloys. When cold flow during work hardening is a characteristic of the alloy, the edges of the rotor 60 are preferably relieved, as by chamfering in well known manner, not shown, to accommodate metal displaced during work hardening. Of course, for high reliability use of the invention, either conventionally hardenable or some of the so-called exotic metals can be utilized.

Figure 4:
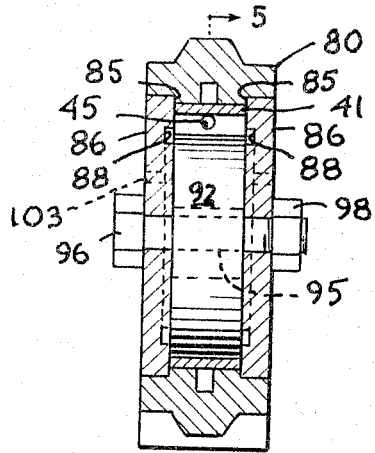
FIG. 4 is a view similar to FIG. 2 of a modification of the invention, and taken substantially on lines 4—4 of FIG. 5.
Figure 5:
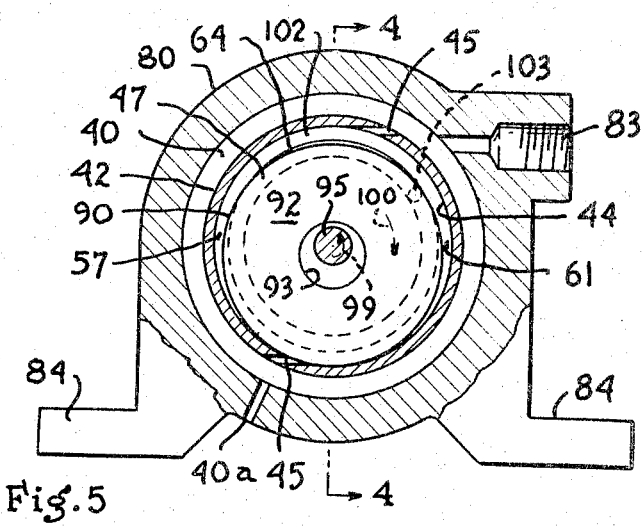
FIG. 5 is a vertical sectional view similar to FIG. 3, but taken substantially on lines 5—5 of FIG. 4.

FIGS. 4 and 5 show a modified form of the invention and includes a perforated disk to facilitate a bolt assembly, and is particularly useful in certain capacity vibrators and in several applications thereof. This form of the invention has many characteristics similar to the first form above. Perforated disks, for example, can also be used in the first form to attain desired weight per diameter and/or to provide desired gyroscopic characteristics.

A casting 80 may be substantially identical in the center portion thereof as viewed in FIG. 4, but for a given size can be thinner than that of the modification described above. The casting 80 has a peripheral center groove 82 to which air is supplied under pressure through a boss 83 in the casting. The casting 80 is mounted in any suitable manner such as by legs 84 having a bottom surface adapted to engage a device to be vibrated.

The casting 84 has a pair of opposite substantially identical shoulders 85 in which internal flat faces of a pair of sealing plates 86 are adapted to abut. Each sealing plate 86 has an annular groove 88 as and for the same purpose as the grooves 71 of FIGS. 2 and 3 and likewise cooperable with the peripheral edge 90 of a ring shaped rotor 92, which rotor has a central hole 93. A bolt 95 has a head 96 engaging one plate 86 and a suitable lock nut 98 engages the other plate. The bolt 95 passes through the hole 93 in the rotor 92 and is provided with ample clearance with respect thereto in all positions of the rotor 92 to prevent contact therebetween at all times. The edge 90 of the rotor 92 will ride on the internal surface 44 of the ring 41 to provide an orbital path 99 for the center of gravity of the rotor 92 while the same rotates in the direction of the broken line arrow 100.

In operation, the modification of FIGS. 4 and 5 is substantially identical to that of the modification shown and described in connection with FIG. 2, but does have a different gyroscopic moment inasmuch as the hole 93 may be of greater or lesser diameter whereby to concentrate the gyroscopic-force-creating mass-domains nearer to the periphery 90 of the rotor 92 as the hole 93 is enlarged. As is well known, the gyroscopic formula follows a diameter squared mathematical formula; and when the disk comprising the rotor is solid, this portion of the formula is divided by a factor of two. If all of the metal providing mass is concentrated at the rim comprising the edge 90, the gyroscopic formula would read simply diameter squared. Of course, this is not possible.

As mentioned above, the exact nature of gyroscopic precessional forces created in the several rotors may vary substantially depending upon the degree of movement of the vibrator bodily as it vibrates an object to which it is attached. This is further complex inasmuch as vibrations induced in one plane can gyroscopically cause secondary vibrations in non-parallel planes which effect the surface supporting the vibrating equipment and accordingly render the resultant vibrations multi-phase and multi-planar. The not readily ascertainable multi-vibrations depending upon the orbits of the rotor 92 per unit of time (which unit establishes a primary mode of vibration in a first plane parallel to the paper as viewed in FIG. 5) also creates precessional vibrations due to the gyroscopic action of the rotor 92 as it makes rotations (in contradistinction to orbital vibrations) per unit of time. In the modification of FIGS. 4 and 5, the orbital induced vibrations around the path 99 are always greater in number than the revolutions of the rotor because the ring 92 is essentially larger in at least the preferred form of this modification of the invention such as shown in FIGS. 4 and 5, and in diagrammatic form in FIGS. 9, 10 and 11. It is to be understood, however, that the rings can be smaller to operate in the linear functions area of the chart, FIG. 1.

With the modification shown in FIGS. 4 and 5 in operation, the air is introduced through ports 45 in the ring 41 to cause orbiting and rotation of the rotor 92 about the raceway surface 44. The air will exit through an ecliptic opening 64 on the internal face 102 of a closure plate 86, thence to be exhausted through one or more outlet ports 103 in each of closure plates 86; substantially identical to the function and at pressure drop values explained in connection with FIGS. 2 and 3.

With reference again to FIGS. 2 and 3, the rotor 60 explained therein was assumed to be operating within the area defined by points 20, 22, 26 and 25, FIG. 1, and may be approximately 93 percent of the diameter of the bore defined by the raceway surface 44. As pointed out more in detail in connection with FIG. 1, the desired forces are selected and a suitable rotor diameter picked after determination of permissible revolutions of the rotor and desirable high frequency orbital vibrations induced by orbiting of the rotor. It is to be further noted in connection with the details of construction of FIG. 3 that, from a point of contact 105 on the rotor 60 as a reference, the rotor 60 will be caused to pass through 360 degrees of rotation of the rotor many times before returning to the exact position shown. By selecting a non-evenly divisible ratio of the bore diameter to the rotor diameter, such point 105 may be caused not to re-register regularly with a point 106 with which it is shown in registry, FIG. 3. By properly selecting the diameters of the bore defined by the surfaces 42 and 44, FIGS. 3 and 5 respectively, the point 105 may migrate with respect to the point 106 so that a very high number of revolutions of the rotors 60 and 92 will be required before the points 105 and 106 re-register with respect to each other.

Because of the rotation characteristic mentioned above, ordinary (not precise) machine finishes of both the surfaces 42 and 44 and the peripheries 74 and 90 of the rotors 60 and 92 can be tolerated. On continued operation of such a device, irregularities of either the contacting surfaces are not inclined to become aggravated by frequent contact one with the other. In fact, small imperfections and irregularities will be worn away and are self-correcting in this device.

Figure 6:
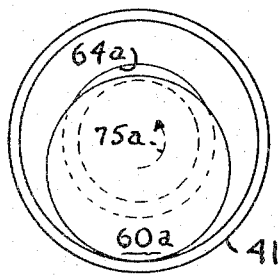
FIGS. 6, 7 and 8 are diagrammatic views of the modification shown in FIGS. 1 and 2, showing different sized rotors in a given sized bore of a raceway.
Figure 7:
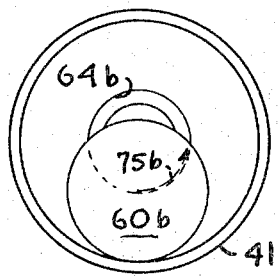
Figure 8:
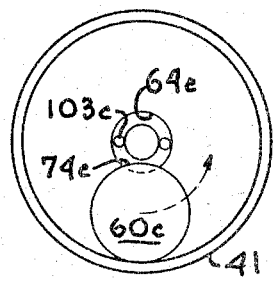

Referring now to FIGS. 6, 7 and 8, solid rotors 60a, 60b and 60c are shown as being in rings 41 for orbiting around paths 75a, 75b and 75c, respectively, and the edges of the disks 60a, 60b and 60c are arranged to cooperate with outlet ports 64a, 64b and 64c, respectively, in a rotary ecliptic manner substantially the same as mentioned and described in connection with FIGS. 2 and 3. These rotors 60a, 60b and 60c will each require a somewhat modified annular relationship with respect to the diameter of the slot 64a forming an ecliptic to provide a pressure drop through the different rotors of substantially 95 percent of the pressure of the inlet driving fluid therefor, at least when the driven fluid is air or other gas having similar frictional flow characteristics.

It is to be noted that the rotor 60a, 60b and 60c of FIGS. 6, 7 and 8, respectively, are respectively smaller in diameter and accordingly have a less percentage of diameter as interpreted with regard to FIG. 1. The apparatus arranged as shown in FIGS. 6 and 7 will have non-linear characteristics residing on the right-hand side of the line 18 at a rotor diameter of 50 percent of the diameter of the bore (surface 44 of FIG. 2). It is further to be noted that these rotors having diameter that lie substantially at the peak of the curve 16, FIG. 1, and accordingly have the greatest pound-inch unbalance. It is to be noted however that these rotors will also lie in the area of only a few orbital vibrations to one revolution of the rotor, and accordingly the frequency of vibration will be correspondingly low. This is not a disadvantage in many adaptations of this device and is highly desirable in certain of them.

The device shown in FIG. 8 is sized so as to have less than one orbital vibration per one revolution of the rotor 60c and accordingly the characteristics thereof lie on the left-hand side of line 18, FIG. 1. In this form of the invention, the upper peripheral surface 74c is less efficacious in the ecliptic exhaust port function, and any smaller rotors would be provided only with a given size exhaust orifice at the center of the closure plates 65 to maintain substantially a 90 percent pressure drop through the device in keeping with the teachings of this invention.

Figure 9:
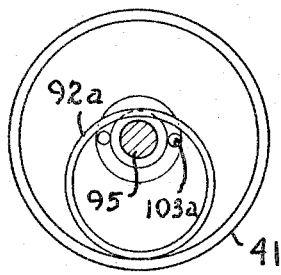
FIGS. 9, 10 and 11 are diagrammatic views of the modification shown in FIGS. 2 and 4 and having different sized rotors of ring type.
Figure 10:
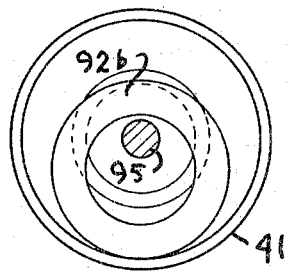
Figure 11:
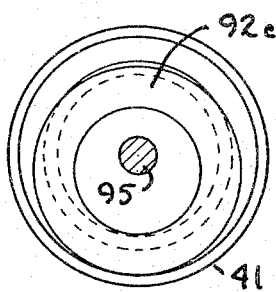

FIGS. 9, 10 and 11 represent selected perforated rotors applicable in the modification of the invention described above and shown in FIGS. 4 and 5. FIGS. 9, 10 and 11, respectively, show vibration-inducing rings 92a, 92b and 92c of respectively increasing outside diameters with successively decreasing internal diameters. It is to be understood in keeping with the practice of this invention that there are a multitude of possibilities of different configurations of the rings 92, 92a, 92b and 92c in keeping with selections that are made by use of the chart of FIG. 1 or charts that can be constructed in keeping with teachings set forth above in the specification.

Although each of the forms of the modifications of the above-described vibrators have been shown in an upright position, these devices are capable of operating in all positions of orientation. It is desirable, when the forms are constructed and arranged to provide high gyroscopic forces, that a lubricating medium other than air, such as oil or the like be used either with air, or the like, or as the driving fluid.

Each of the modifications described above avail significant new attributes. Vibrators of this kind attain high efficacy when operating at high r.p.m.; because the law of centrifugal force contains an r.p.m. squared factor. As pointed out briefly above, the herein-disclosed vibrators operate at the highest r.p.m. when the rotors contact a maximum area of raceway. Accordingly, the higher centrifugal forces are generated with large surface contact; preferably, though not in a limiting sense, from a rotor diameter of 70 to 95 percent of bore diameter.

Another attribute of the invention, in connection with the above attribute, resides in the provision of a small number of different parts to be stocked by a manufacturer or user of the vibrators. For example, rotors match castings and/or raceway rings and closure plates, but not essentially the latter. Rotors cooperate with castings and/or raceway rings for different characteristic modes of the vibrators. The closure plates, further, can be shouldered (not shown) so as to accommodate different lengths (thicknesses) of rotors. Parts can therefore be stocked, for example, according to casting sizes, and conveniently cataloged and coded at 10″, 9″, 8″, etc., to a desirable minimum in raceway lengths (corresponding to rotor length +.004″, for example) of 5″, 4″, . . . ½″, etc. The rotors and closure plates may be similarly coded, with same bearing percent of bore diameter.

In accordance with the above example used in connection with FIG. 1, in keeping with a code system such as immediately above, a vibrator for providing a centrifugal force of 6,000 pounds, at 10,000 orbital vibrations per minute, could be coded as 10–½–95. This represents a 10 inch bore, ½ inch long, and a rotor of 95% of bore diameter.

In keeping with the teachings above, a mechanic or machine operator can exchange and/or replace parts to change vibrator characteristics. The body does not necessarily need be removed to make such change, particularly when excess forces are being generated. For example, if it is desired to reduce the capacity of a 10–½–95 vibrator, different assemblies may be made. A 10–½–875 would require only an 8.75" rotor; or other rotor diameters could serve more aptly. If a 9 inch bore is indicated as more apt, a 10 inch outside diameter raceway ring and smaller rotor may be best; etc., and designated with 10R9 code, or the like.

If a shorter (thinner) rotor is indicated, shouldered closure plates may be used therewith to effect the change while using the same casting; and these examples represent only a few of the possibilities of this invention.

While I have shown and described in detail two modifications of this invention and a method of ascertaining and/or selecting rotor structures in terms of unbalanced weight in pound-inches with respect to diameter of a rotor in percent of diameter of bore, further in consideration of the number of orbital vibrations to be obtained per one revolution of the rotor, and at least one manner for conveniently practicing the method to provide devices for a multiple of uses, obviously other modifications and adaptations of this invention will occur to others working in the art. Accordingly, I wish not to be limited in my invention only to the specific forms and methods described above, but by the scope and spirit of the following claims.

I claim:

1. In a fluid operated vibrator, a source of pressurized fluid, housing means connected to said source including means defining a generally circular orbit, orbiting means having a diameter at least 60% of the diameter of said orbit and being constrained in said orbit in said housing means, and means in said housing means positionally controlled by said orbiting means for establishing an orbiting fluid outlet.

2. A vibrator substantially as set forth in claim 1, said means defining said orbit and/or said orbiting means being fabricated from material having the characteristic of work hardening.

3. A vibrator substantially as set forth in claim 1, said orbiting means being a disc, and at least one perimetrical edge of said disc controlling said fluid outlet.

4. A vibrator substantially as set forth in claim 3, said disc being fabricated from material having the characteristic of work hardening.

5. A vibrator substantially as set forth in claim 3, including means establishing a second fluid outlet and a second perimetrical edge of said disc controlling said second outlet.

6. A vibrator substantially as set forth in claim 3, said orbit defining means comprising means forming a bore within said housing cooperable with said disc.

7. A vibrator substantially as set forth in claim 6, said housing means forming a perimetrical annular groove around said bore for containing the pressurized fluid, and at least one air passageway between said groove and said bore.

8. A vibrator substantially as set forth in claim 7, said passageway being oriented for directing air inwardly substantially tangentially with relationship to said bore and/or disc.

9. A vibrator substantially as set forth in claim 8, said bore and disc constraining and defining therebetween an orbiting volume of relatively high pressure fluid.

10. A vibrator substantially as set forth in claim 8, said bore and disc constraining and defining therebetween an orbiting volume of relatively low pressure fluid.

11. A vibrator substantially as set forth in claim 8, and an orbiting volume of relatively low pressure fluid spaced substantially diametrically opposite to said volume of relatively high pressure air.

12. A vibrator substantially as set forth in claim 11, said housing including side plates, and at least one of said plates forming an outlet opening for said low pressure air.

13. A vibrator substantially as set forth in claim 12, said outlet opening being shaped and oriented with respect to said disc to be partially covered thereby.

14. A vibrator substantially as set forth in claim 13, said outlet opening being an ecliptic phased by operation of said disc.

15. A vibrator substantially as set forth in claim 13, said outlet opening being adapted to effect a decrease of pressure of fluid passed through the vibrator.

16. A vibrator substantially as set forth in claim 15, the pressure decrease being approximately 95% of the pressure of supplied fluid.

17. In a fluid operated vibrator, a source of pressurized fluid, a housing part connected to said source defining a generally circular orbit, an orbiting roller constrained by said housing part having a diameter at least 60% of the diameter of said orbit, and outlet port means in said housing part covered to a predetermined extent by said roller for establishing an orbiting fluid outlet restricting outward fluid flow to a predetermined extent for controlling energy release of fluid within said vibrator.

18. In a fluid operated vibrator, a source of pressurized fluid, a housing connected to said source, an orbiting part having a diameter at least 60% of the diameter of said orbit constrained in an orbit by said housing, means in said housing forming a fluid outlet, and means controlled by said orbiting part for forming an ecliptic for said fluid outlet.

19. In a pressurized fluid driven vibrator including a housing having means forming a fluid inlet opening for relatively high pressure fluid and means forming a fluid outlet opening for relatively low pressure fluid, vibration inducing means retained within said housing for movement in an orbit under the influence of pressure energy release from the fluid and being operably associated with said outlet opening for causing the fluid to exit therethrough in an ecliptic, said outlet openings in said ecliptic being between orbiting high and low fluid pressure areas acting on said inducing means and the size of said outlet opening with relationship to said inlet opening being selected to provide predetermined high efficiency energy release from said fluid.

20. A pressurized-fluid-driven vibrator comprising a housing having a bore, an orbiting disc-shaped rotor within said bore, said rotor being driven by pressurized fluid and cooperable with said bore to obtain at least one predetermined characteristic substantially according to a first ratio of orbital rotor vibrations with respect to rotor rotation and an unbalanced pound-inch second ratio with respect to bore and rotor diameters, the ratio of rotor diameter to bore diameter being at least 60%, and means constraining sides of said rotor to follow a predetermined path of travel therefor upon said bore within said housing.

21. In a vibrator substantially as set forth in claim 20, said first ratio being established substantially in accordance with the formula: Ratio equals rotor diameter divided by the difference between bore diameter and rotor diameter.

22. In a vibrator substantially as set forth in claim 20, said first ratio being established substantially in accordance with the formula: Ratio plus one equals bore diameter divided by the difference between bore diameter and rotor diameter.

23. In a vibrator substantially as set forth in claim 20, said second ratio being established in pound-inch values substantially in accordance with the formula: Ratio equals the difference in inches between bore radius and rotor radius, said difference being multiplied by the weight of said rotor in pounds.

24. A pressurized-fluid-driven vibrator comprising a housing having a pressurized-fluid inlet, at least one side closure member for said housing, said housing and closure member forming an approximately circular walled and at least partially flat-ended enclosure, a generally disc-shaped rotor having a diameter at least 60% of the diameter of said circular walled enclosure confined for rolling movement upon a perimetrical edge of same within said enclosure upon said circular wall thereof, and means cooperable with an edge of said rotor forming an outlet for fluid from said enclosure for maintaining a predetermined pressure drop of fluid within said enclosure.

References Cited by the Examiner

UNITED STATES PATENTS

| | | | |
|---|---|---|---|
| 2,136,946 | 11/1938 | McCurdy | 29—149.5 |
| 2,179,824 | 11/1939 | Kip | 308—36.2 |
| 2,198,148 | 4/1940 | Baily | 259—1 |
| 2,735,165 | 2/1956 | Soref et al. | 29—407 |
| 2,793,009 | 5/1957 | Peterson | 259—1 |
| 2,891,775 | 6/1959 | Malan | 259—1 |
| 2,906,016 | 9/1959 | Cannon et al. | 29—407 |
| 2,960,314 | 11/1960 | Bodine | 74—87 X |
| 3,069,750 | 12/1962 | Koppelman | 29—90 |
| 3,135,124 | 6/1964 | Sartor et al. | 74—87 |
| 3,139,101 | 6/1964 | Wyczalet et al. | 134—186 |
| 3,166,772 | 1/1965 | Bodine | 15—22 |
| 3,171,634 | 3/1965 | Malan | 259—1 |

FRED C. MATTERN, Jr., *Primary Examiner.*

BROUGHTON G. DURHAM, *Examiner.*

F. E. BAKER, H. C. COE, *Assistant Examiners.*